United States Patent [19]

Greenberg

[11] Patent Number: 4,640,303

[45] Date of Patent: Feb. 3, 1987

[54] SEISMIC ACTIVATED VALVE

[76] Inventor: Donald S. Greenberg, 11228 Barnett Valley Rd., Sebastopol, Calif. 95472

[21] Appl. No.: 720,572

[22] Filed: May 20, 1985

[51] Int. Cl.[4] ............................................. F16K 17/36
[52] U.S. Cl. ......................................... 137/38; 251/65
[58] Field of Search ................................. 137/38, 39; 200/61.45 M; 251/65

[56] References Cited

U.S. PATENT DOCUMENTS 3,270,159 8/1966 Soos ............................ 200/61.45 M
3,783,887 1/1974 Shoji ..................................... 137/38

FOREIGN PATENT DOCUMENTS 48847 4/1977 Japan ..................................... 137/38
13273 1/1983 Japan ..................................... 137/38

Primary Examiner—Robert G. Nilson
Attorney, Agent, or Firm—Glen R. Grunewald

[57] ABSTRACT

A seismic activated valve having a sphere of magnetic material held above a valve seat by a magnet located at the apex of a dome, whereby the inertia of the sphere will cause it to roll along the curvature of the dome to move it vertically away from the magnet and out of axial alignment with it when the valve experiences a horizontal thrust.

12 Claims, 3 Drawing Figures

SEISMIC ACTIVATED VALVE

FIELD OF THE INVENTION

This invention is in the field of automatic shut off valves that are activated by an earthquake, explosion or other strong horizontal thrust.

BACKGROUND OF THE INVENTION

Among other problems, earthquakes cause gas lines to rupture that in turn release explosive or dangerous gases. For example, natural gas utility lines may rupture to release natural gas. Ruptured gas lines outdoors may release flammable gas but explosive accumulations do not occur. A ruptured gas line indoors however may fill a room with an explosive mixture of gas and air.

Valves that automatically shut off gas lines during earthquakes are known. These usually use inertia as the activating factor. Valves are frequently closed by a pendulum which triggers a switch or otherwise releases a valve closing means. These devices suffer defects among which are that they become rusty or lubricant dries in long periods of disuse and moving mechanisms don't work well, that they do not have graded sensitivity and that they can be triggered by vertical thrusts such as the vibration caused by a train or truck or by being struck accidentally with a hammer.

Some structures are engineered to resist severe earthquakes while others are not. Some structures should continue to have gas supply during moderate earthquakes while others should not. Valves that accomodate to all situations are not generally available.

It is also desirable to shut off gas flow in emergency situations other than earthquakes, for example, when pressures or temperatures of a process run out of control or when utilities are lost. Such valves should respond when situations other than severe lateral thrusts occur and inertia activated valves are not adequate for such situations.

Although the foregoing discussion is related to earthquakes, valves of this nature are also useful when they are activated by explosions or other strong lateral thrusts.

SUMMARY OF THE INVENTION

This invention is a seismically actuated valve that overcomes or greatly mitigates the above mentioned problems. The valve of this invention may be activated by any lateral thrust, may have its sensitivity graded so that moderate thrusts will not actuate it whereas severe thrusts will, and in some embodiments may be actuated by emergency situations where there are no thrusts at all but merely a situation that calls for emergency shutdown of gas lines. The valve of this invention also is almost completely unaffected by vertical thrusts as well as being unaffected by the character or the flow pattern of the gas passing through the valve.

The valve of this invention includes a valve body having a gas inlet and a gas outlet with a valve seat between them. The valve seat in the valve of this invention is positioned so that it is normally horizontal, specifically, that when the valve is in use it may be connected so that the valve seat is horizontal. The inlet and outlet ports of the valve are usually horizontal but the valve may be made to orient them otherwise. The valve of this invention also has a closure member which is preferably a sphere. The closure member is made of a ferromagnetic material, specifically, a material that is attracted to a magnet. The closure member may be iron and it may or may not have a coating such as stainless steel, brass, or plastic. The coating may be rigid or resilient, the only limitations to the coating being that it must not be so thick or of such material that it will prevent the closure member from being held by a magnet. The closure member in a preferred embodiment is a free member being connected to no portion of the valve. The closure member must be in a portion of the valve normally above the valve seat and preferably vertically aligned with the valve seat.

The device of this invention includes a dome that is located above the valve seat and that preferably is in the form of a spherical segment having a larger radius than the radius of the closure member. A magnet is located at the apex of the dome. The magnet may be a permanent magnet, an electromagnet or a magnetic circuit including a permanent magnet and an electromagnet and it may be located outside of the dome so that the dome may be a continuous element through which gas cannot leak.

Another preferred embodiment of the invention includes means to reset the valve after it has closed. The preferred means includes a cradle having major dimensions smaller than the opening of the valve seat and being located beneath the valve seat. The cradle is connected to a plunger that extends beyond the interior of the valve so that the plunger can be operated to move the cradle through the valve seat, to pick up the closure member on the cradle and to move it into contact with the apex of the dome. The plunger preferably is spring driven to move it into its lowermost position so that, unless it is being manually operated, it will occupy a position beneath the valve seat.

When a permanent magnet is used the sensitivity of the valve may be adjusted by moving the permanent magnet closer to or farther from the apex of the dome. The magnetic attraction of the magnet for the valve member is diminished by increasing the distance between them. When a very sensitive valve is desired the permanent magnet can be moved away from the apex of the dome so that the force exerted by the magnet on the closure member is small and just enough to hold it against the dome. Conversely, when a very insensitive valve is required the magnet may be moved very close to or in contact with the apex of the dome and in that position it will hold the closure member more firmly.

An important feature of the device of this invention is the dome with the magnet at its apex. When the closure member is being held by the magnet it occupies the space at the apex of the dome. Accordingly, lateral thrusts will not only move the closure member out of alignment with the magnet but it will also increase the vertical distance between the magnet and the closure member in that the closure member will be caused to roll around the curved surface of the dome as it is laterally displaced from alignment with the magnet. Vertical forces such as being pounded with a hammer or vertical vibrations caused by a passing train or truck will not cause lateral displacement of the closure member and accordingly will not increase the vertical distance between the closure member and the magnet. In addition, in the preferred embodiment where the interior of the dome is lined with elastomeric material or where the closure member is coated with a layer of elastomeric material, even very strong vertical forces will be damped thereby reducing the tendency of the closure member to bounce out of contact with the inside surface of the dome when vertical forces cause the valve to vibrate or even cause severe vertical displacement of the valve.

The valve of this invention may be adapted for emergency closures in situations such as where utilities fail. Thus, when the magnet is an electromagnet that is energized by a power source that also is required to maintain a process or device functioning, failure of that power source will also deenergize the magnet and cause the closure member to seat whereby the valve becomes closed. A single valve in accordance with this invention may thus protect against both seismic activity and utility failure. It is evident that other emergency failure situations may activate the valve if an electromagnet is employed and emergency situations are connected through means to deactivate the electromagnet power.

In another embodiment, the closure member may be held in place with a permanent magnet that is surrounded by a coil which in turn is connected to a power source being connected to oppose the polarity of the permanent magnet. In this embodiment an emergency situation, such as failure of utilities, will cause the coil to be energized thereby neutralizing the magnet and causing the closure member to be released.

In another preferred embodiment of the invention the dome is maintained at the top of a cavity that is deep enough to completely contain the closure member and a baffle is employed at the bottom of the cavity to direct the flow of fluid through the valve away from the cavity. With that arrangement flow patterns in the gas stream passing through the valve will not create turbulence or other conditions that would exert forces against the closure member that would influence the ability of the magnet to hold the closure member against the apex of the dome.

DETAILED DESCRIPTION OF THE DRAWING

Figure 1:
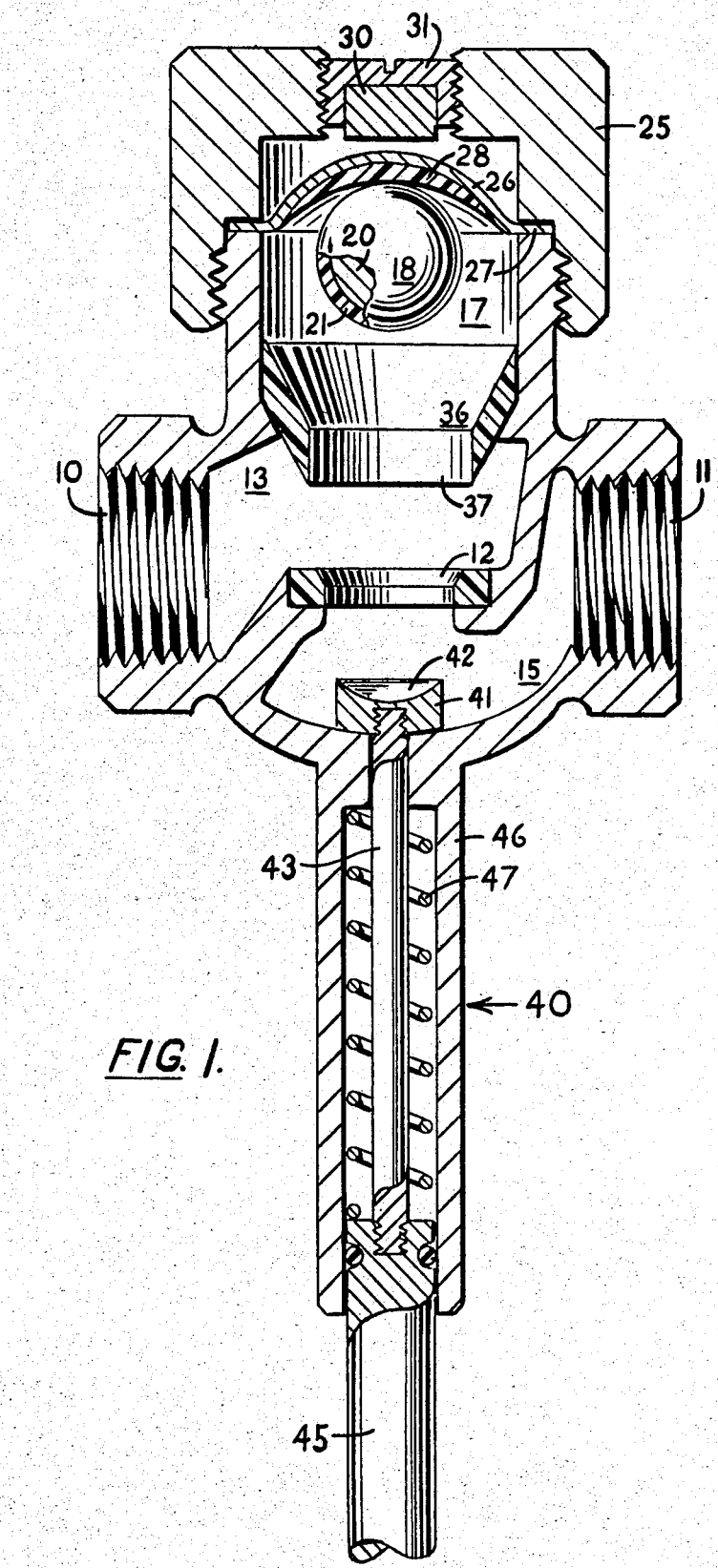
FIG. 1 is a partial cross-section, partly schematic of a device embodying this invention.

FIG. 1 illustrates an entire valve embodying this invention. The valve includes an inlet generally designated 10 and an outlet generally designated 11. Between the inlet and the outlet is a valve seat 12 which is shown as a separate element but which may be integral with the cast valve body. Above the valve seat 12 is an inlet chamber 13 and below the valve seat 12 is an outlet chamber 15. Above chamber 13 is a closure chamber 17 in which closure member 18 exists in normal operation. Closure member 18 is a spherical iron core 20 surrounded by a soft elastomeric skin 21 which may be employed when it is desired to improve the seatability of closure member 18 or to protect the iron from corrosive gases. As illustrated the closure chamber 17 is sealed by a cap 25. Cap 25 is made to hold dome 26 by embracing the flange 27 between cap 25 and the top of chamber 17. Dome 26 is normally a gas impervious metal such as brass and it is illustrated to be lined with an elastomeric material 28.

Cap 25 is constructed to include a permanent magnet 30 which, in the illustrated embodiment, is held in a cavity in a brass plug 31 which is held to cap 25 with threads. Screwing brass plug 31 into or out of cap 25 adjusts the distance that magnet 30 is from dome 26 which in turn adjusts the distance that magnet 30 is from closure member 18 thereby adjusting the magnetic force holding closure member 18 at the apex of dome 26.

In the embodiment of FIG. 1 a baffle 36 is employed to divert gas flow from entering or causing turbulence within chamber 17. The baffle 36 is in the form of a truncated cone having a lower opening 37 that is larger in diameter than closure member 18. Closure member 18 is larger in diameter than the opening in valve seat 12 in that it is adapted to seat in valve seat 12 to prevent the flow of gas from inlet 10 to outlet 12.

The illustrated device also includes a reset means generally designated 40. The reset means includes a cradle 41 which has a cup shaped upper surface 42 having a radius of curvature equal to or slightly greater than a radius of curvature of closure member 18. A plunger 43 is connected to cradle 41 so that movement of the plunger will produce a corresponding movement of the cradle. The plunger in turn is connected to handle 45 and the handle and plunger both ride in a cavity in extension 46. A spring 47 is maintained in the cavity to exert a spring force urging handle 45 out of the cavity and therefore urging cradle 41 to the position shown in FIG. 1.

In operation the valve is installed in approximately the position shown with the inlet 10 connected to the upstream side of the flow system and the outlet 11 connected to the downstream side of the flow system. In the position shown in FIG. 1 the valve is entirely open and there is no obstruction to the flow of gas from inlet 10 to outlet 11. Magnet 30 is positioned to exert enough magnetic force to hold closure member 18 firmly against the apex of the dome 26.

The valve of this invention being one that responds only to emergencies may function in the position shown for many years. One of the advantages of this invention is that lubrication and maintenance are not required in order for the valve to become operative after years of being dormant or to operate with the same degree of sensitivity it has initially after being dormant for many years.

If an earthquake or other severe lateral thrust occurs the inertia of closure member 18 will tend to keep it in its position while the valve body is moved to the right or to the left by the lateral force. As a result, the closure member 18 will roll downwardly along the interior of dome 26 so that it becomes both axially displaced from the magnet 30 and vertically spaced farther from magnet 30 whereby the magnetic force holding it in place diminishes to the point where closure member 18 falls. Closure member 18 will fall through the hole 37 in baffle 36 either directly or by rolling down the conical surface of baffle 36 and it will fall into the hole of valve seat 12. The flow of gas from inlet 10 toward outlet 11 will both drive closure member 18 into valve seat 12 and will exert force to hold it there firmly. With the closure member 18 firmly held in valve seat 12 the flow of gas through the device of this invention is stopped until it is restored by a deliberate manual action. That manual action is urging handle 45 upwardly far enough so that cradle 41 will catch closure member 18 in cup 42 and will raise closure member 18 until it is again in contact with the apex of dome 26 where it will be held by magnet 30.

Figure 3:
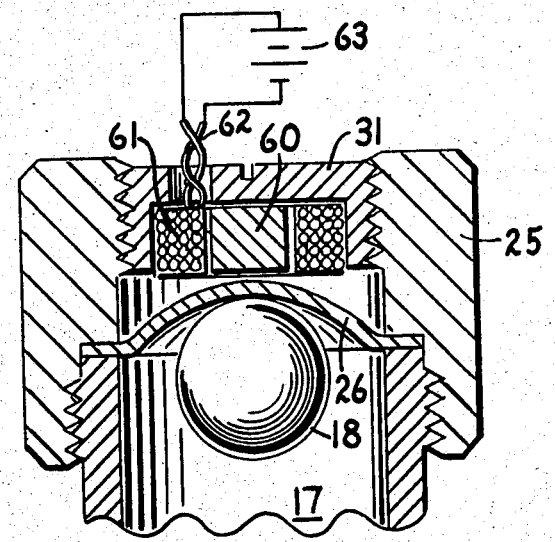
FIG. 3 is a partial cross-section of another embodiment of the invention.

FIG. 3 illustrates an embodiment of the invention in which an electromagnet is employed instead of a permanent magnet. In the embodiment of FIG. 3, a soft iron core 60 is surrounded by electromagnet coil 61, and both are fixed in place within brass plus 31. Electric current from battery 63 is supplied to coil 61 through lead wires 62, and produces the magnetic force necessary to hold closure member 18 at the apex of dome 26. Battery 63 may be replaced by any suitable source of current, either alternating or direct current. The valve of FIG. 3 may be used to shut off the flow of gas during emergencies other than seismic emergencies. Any fault condition can be made to interrupt the current through coil 61, thereby releasing closure member 18 to fall into valve seat 12 as described above.

Figure 2:
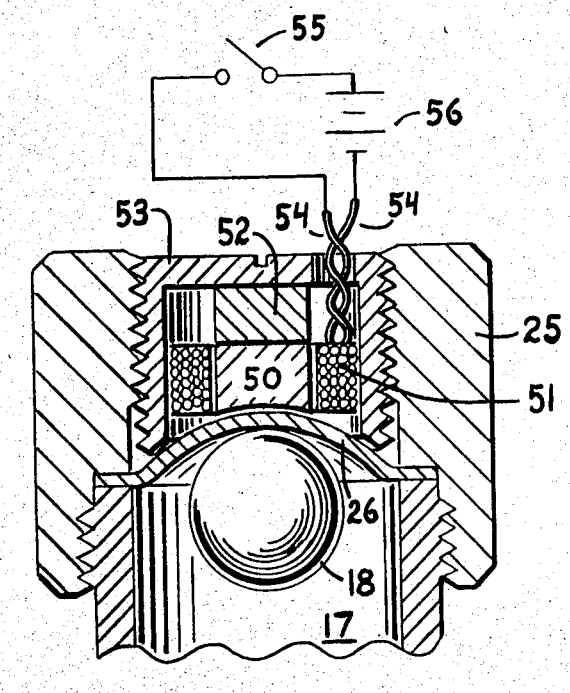
FIG. 2 is a partial cross-section of another embodiment of the invention.

FIG. 2 illustrates an embodiment of the invention in which both a permanent magnet and an electromagnet are employed, and in which a momentary pulse of current through the electromagnet will cause the valve to close. In the embodiment of FIG. 2, soft-iron pole pieces 53, 50 contact the upper and lower pole-faces, respectively, of permanent magnet 52. An electromagnet coil 51 surrounds the lower pole-piece 50. Lead wires 54 connect coil 51 to battery 56 and switch 55, illustrated schematically. Magnet 52, pole-pieces 53, 50 and closure member 18 form a magnetic circuit through which flows most of the magnetic field generated by magnet 52. When switch 55 is open, as illustrated, coil 51 has no effect on this magnetic circuit. The magnetic force on closure member 18 is sufficient to suspend it at the apex of dome 26. When switch 55 is closed, coil 51 generates a magnetic force that opposes the field through the magnetic circuit and forces the field away from closure member 18. The magnetic force holding closure member 18 is thus weakened or eliminated and closure member 18 is released to fall into valve seat 12 as described above.

The valve of FIG. 2 may thus be used to shut off the flow of gas during both seismic or non-seismic emergencies. It requires no electrical current or connection to respond to seismic emergencies, and only a momentary pulse of current to close the valve during non-seismic emergencies.

What is claimed is:

1. A seismically actuated valve comprising
   a. a valve body having an inlet, an outlet, and a normally horizontal valve seat located between said inlet and said outlet,
   b. a closure member located above said valve seat, said closure member being spherical and made of ferromagnetic material,
   c. a cavity located above said valve seat, said cavity being sufficiently large that said closure member may reside within it,
   d. a dome located at the upper end of said cavity, said dome forming the continuous and concave upper surface of said cavity,
   e. a magnet located above said dome.
2. The valve of claim 1 including a baffle within said cavity.
3. The valve of claim 1 wherein, said dome seals the interior of said valve from the atmosphere.
4. The valve of claim 1 wherein the distance between said magnet and said dome is adjustable.
5. The valve of claim 1 wherein said dome is a spherical segment.
6. The valve of claim 1 wherein said magnet is a permanent magnet.
7. The valve of claim 1 wherein said magnet is an electromagnet.
8. The valve of claim 1 wherein said magnet includes both a permanent magnet and an electromagnet coil that, when energized, acts to weaken or eliminate the magnetic field through said closure member.
9. The valve of claim 1 wherein said dome is lined with resilient material.
10. The valve of claim 1 wherein reset means is located beneath said valve seat.
11. The valve of claim 1 wherein said closure member is coated with a layer of resilient material.
12. The valve of claim 10 wherein said reset means includes a cradle having a major dimension smaller than the opening of said valve seat, having means to support said valve member, and having means to move said cradle vertically a distance sufficient to move said valve member into contact with the apex of said dome.

* * * * *